Patented Jan. 4, 1927.

1,613,341

UNITED STATES PATENT OFFICE.

WILLIAM E. CARSON, OF RIVERTON, VIRGINIA.

PROCESS OF PRODUCING HYDRATED LIME.

No Drawing.   Application filed April 4, 1924. Serial No. 704,287.

This invention relates to processes of producing hydrated lime; and it comprises as a new article a dry hydrated lime existing as a mass of extremely fine particles, said lime having a plasticity in excess of 200 and being substantially completely miscible with water to make milk of lime of the ordinary properties; and it further comprises a process of slaking lime to produce dry hydrate having a plasticity in excess of 200 wherein quicklime is ground to 100 mesh fineness or finer and the fine ground lime is quickly admixed with a limited amount of water, admixture being completed prior to occurrence of any substantial hydration and the amount of water being such as to give a dry hydrate without a rise in temperature above, say, 105° C.; all as more fully hereinafter set forth and as claimed.

Dry hydrated limes vary extremely in plasticity and these variations are of great working importance. Commercially, those limes showing a plasticity less than 200 on Emley's plasticimeter (the usual instrument for testing described in the Technologic Paper No. 169 of the Bureau of Standards and further illustrated in the Book of Standards for 1925, published by the A. S. T. M. under standard specifications for hydrated lime for structural purposes) rank as "mason's hydrate", while those having a plasticity over 200 are regarded as "finishing hydrate". Very many attempts have been made to produce dry hydrates by quick methods which on mixing with water will have the desirable plasticity and putty-like characteristics of lime slaked in a mortar box by a skilled workman, but without entire success. The best of these products, such as those made from certain Ohio limestones, will withstand the blotting paper test (described in the technologic paper referred to above). These better grades can be troweled out on blotting paper to a considerable extent; but most of the dry hydrates can be troweled out on blotting paper only to a less extent. With the better grades, but little water is taken up by the paper during the spreading; they owe their plasticity to the fact that they hold their water positively; in a condition that withstands the suction of the paper.

None of the dry hydrates is completely miscible with water to form ordinary milk of lime. In this respect, they range from those which will give no milk of lime to those which will give some, although usually but little—these latter being the better grades referred to.

It is the object of the present invention to produce a new type of dry hydrate existing as a mass of extremely fine particles; such mass being substantially completely miscible with water to form lime milk of the ordinary properties; and on mixing with water, giving mortars of even higher grade than those produced by skilled workmen in wet slaking. This lime will rank as a finishing hydrate since its plasticity is over 200. As a matter of fact its plasticity is ordinarily over 250.

Slaking lump lime or granular lime is a complex process taking place in stages, in point of time. With a lump of lime of any size, penetration of the water and reaction are, so to speak, rhythmic. The water penetrates a short distance during what may be called a period of incubation, before hydration begins and further penetration temporarily ceases. With hydration comes a local rise in temperature which may go to a theoretical maximum of 580° C.—the equilibrium temperature for calcium hydrate. Rise in temperature to any such point is, however, precluded by vaporization of water as it enters—the familiar steaming. As this water vaporizes, there is a deposition of whatever lime it may carry with more or less agglomeration of the hydrate particles. Fresh water then penetrates beyond the point of hydration and the action is repeated. While the actual amount of heat liberated by the union of water and lime is a fixed quantity, and the consequent rise in temperature is also fixed, yet, because of this localization of action, in using a given amount of lime and of water, unduly high temperatures are observed; that is, temperatures in excess of those which could be calculated for the total mass of lime and of water.

The described rhythmic action involves, of course, a time factor and it is to some extent dependent upon the openness of the pores of the lime; to the distance the water will penetrate during the period of incubation and before its passage is interrupted by the hydrating action. During hydration in the described action, incoming water is removed by vaporization and does not penetrate further. In any event, its passage is further impeded, temporarily, by the swelling of the lime particles in hydration.

I have discovered that by suitably reducing the size of the lime particles complete water penetration can be secured during the period of incubation; that is, prior to occurrence of hydration. Water reaches the center of each grain during this period. And in so doing, the action becomes uniform; the whole body of lime and water hydrates together, without any localized, intermittent development of heat. All parts of the lime being wet, and with the same amount of water, action becomes uniform. In one way of looking at it, I reduce the lime to such a size that complete wetting can occur in a time well within the period of incubation; and surround each individual particle with just the amount of water which will wet it, will hydrate it, and (by conversion into steam) will allow its temperature to go to 100° C, but not much above. In so doing, although of course actually the same number of heat units is liberated as in slaking coarser lime, yet the impression is that of a cooler slaking—there is no localized or temporary development of high temperatures. With a suitable fine grinding of quicklime and quick admixture of water, the whole mass enters into quick interaction. And by properly proportioning the amount of water so as to furnish that needed for (a) hydration and (b) that required for cooling by vaporization, the final result is a mass of dry extremely fine-particled hydrate. As the entering water has had no opportunity to exercise any other function than that of hydration and of vaporization, there is no solution or redeposition of the lime particles formed in hydration—they retain their initial extremely fine state of subdivision; the state of subdivision in which CaO is normally left on slaking lime. The particles are in a colloid state and on access of water peptization takes place at once—milk of lime is formed.

The particular state of fineness required with any given lime depends somewhat upon its character and is best determined by a special laboratory test hereinafter given. Ordinarily, however, I employ lime which will pass at least a 100 mesh sieve (95 per cent through) and it is usually better so that it will pass a 200 mesh. In securing this fineness it is convenient to use mills working upon the air flotation principle. The quantity of water to be used is always just that which will suffice (a) for hydration and (b) for cooling by vaporization. Neither more nor less is wanted; although in calculating the amount required for cooling, due allowance must be made, of course, for the heat capacity of the apparatus, radiation losses, etc., so that the amount is usually somewhat less than pure theory would indicate.

The exact amount of water to be used also depends upon the actual CaO present. The ideal amount of water for my purposes, as regards the amount of actual CaO present, is in the ratio of 1 part CaO and 0.724 parts $H_2O$ at the ordinary temperature, say, 20° C. Such a mixture initially contain 58 per cent CaO and 42 per cent $H_2O$. This is, however, under, so to speak, adiabatic conditions where heat losses, other than those due to volatilization of $H_2O$, are not involved. Under ideal conditions, this amount of water will complete the slaking without a rise in temperature over 100–105° C. and give a hydrate of extreme plasticity; usually above 250.

With proper fine ground, high calcium lime and the proper amount of water quickly mixed, that is, with admixture perfected during the period of incubation, the mass merely steams a little and does not go above 105° C. and usually not above 101° C. and gives a perfectly dry product of extreme fineness and plasticity. Higher temperatures even up to 115° C. are permissible but the stated limit of 100–105° C. is better. In the operation just described, no opportunity is afforded for solution or redeposition of lime; and the fine particles produced in hydration do not increase in size or agglomerate. The proportion of water which is present for cooling purposes simply steams away, without opportunity for effecting solution or change in particle size.

In slaking, one gram molecule of CaO, or 56 grams with the theoretical amount of water, one gram molecule or 18 grams, 15,540 calories are evolved. To take care of this evolved heat by volatilization, leaving a dry lime hydrate at 100° C., there is required, in addition to the 18 grams of $H_2O$, a further amount of water at, say, 20° C., amounting to about 23 grams. Taking volatilization water and hydration water together, there is obtained the theoretical ratio above given, 1:0.724. But, as stated, because of working conditions, some subtraction from the amount of volatile water is practicable and necessary; the subtraction corresponding to radiation, etc., losses by cooling in working.

The whole point of the invention is getting the lime fine enough so that a quick admixture may be made with it, prior to hydration, of the exact amount of water required to hydrate and to cool (by vaporization) the mixture so that it shall take a temperature usually not over 105° C. and shall give a dry hydrate.

While in practice I always grind the lime as fine as 100 mesh and often go above 200 mesh, these extreme finenesses are not always necessary. With a porous, open-textured lime from particular limerocks or produced by particular methods of calcination, somewhat coarser materials may sometimes be used. The exact fineness required for my purposes with any given lime can be readily determined by what may be termed laboratory duplication of plant procedure. A sample of fine ground lime is mixed with the calculated amount of water in a roomy beaker shielded against cooling. If the lime is fine enough, quiet reaction will take place after an incubation period of perhaps a minute during which the water is penetrating the particles; and the whole wet mass quietly changes to a dry fine-particled body of completely hydrated lime. With material too coarse, there will be localization and violent action, and with the calculated quantity of water, not enough will be present to afford complete hydration—there will be unslaked lime present. The quantity of water used in the beaker test is always somewhat more than that required in actual plant practice; but the difference is usually not great and is readily determined. In one particular plant with a mixing time of one minute and the use of an ordinary pugmill system, for mixing, ordinarily I employ, instead of the stated ratio of 1:0.72 about 1:0.50. In this particular case the water added instead of being about 72 per cent of the lime is about 50 per cent.

As stated, the best of the present dry hydrates withstand the blotter test in the sense that a pulped mass of such hydrated lime and water may be troweled over a blotter; but they do not give up much water to the blotter—during spreading the pulp withstands the suction of the paper. With the present hydrate, however, the pulped mass may be troweled over the blotter and at the same time gives up considerable water to the suction. That is, the present lime takes up enough more water in making a plastic mass, because of its extremely colloid nature, to allow passage of some into the blotter without forfeiting plasticity. This is a property which is extremely convenient in operation, because the mason or plasterer desires some of the underlying layer to be wet in spreading mortar. In this respect the present hydrate is much more advantageous than any of the prior preparations, dry or wet. There is also a difference, and an advantageous one, in the consistence of the troweled mass—it has no graininess, but it is buttery or greasy in consistence.

What I claim is:—

1. The process of producing dry hydrated lime which comprises grinding quicklime to a fineness greater than 100 mesh and quickly admixing said ground lime with an amount of water sufficient to react with all the lime to form a dry hydrate without a rise in temperature above 100-115° C.

2. In the slaking of lime, the process which comprises grinding quicklime to such a fineness that intimate admixture with water can be secured prior to any substantial hydration and quickly admixing said ground lime with an amount of water sufficient to form a dry hydrate and to produce a temperature between 100 and 115° C.

3. In the slaking of lime, the process which comprises grinding quicklime to such a fineness that intimate admixture with water can be secured prior to any substantial hydration and quickly admixing said ground lime with an amount of water sufficient to form a dry hydrate and to produce a temperature not exceeding 115° C.

4. In the manufacture of dry hydrated lime having a plasticity in excess of 200, the process which comprises grinding quicklime to about 100 mesh or finer and quickly mixing said ground lime with an amount of water sufficient to form a dry hydrate and to produce a temperature not exceeding 115° C.

In testimony whereof, I have hereunto affixed my signature.

WILLIAM E. CARSON.